: US 8,010,830 B2
(45) Date of Patent: Aug. 30, 2011

(12) United States Patent
Hotta et al.

(54) FAILOVER METHOD, PROGRAM, FAILOVER APPARATUS AND FAILOVER SYSTEM

(75) Inventors: Shinji Hotta, Kawasaki (JP); Satoshi Yoshimura, Yokohama (JP); Toshiki Kunimi, Yokohama (JP); Kouji Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 12/426,493

(22) Filed: Apr. 20, 2009

(65) Prior Publication Data
US 2009/0271655 A1 Oct. 29, 2009

(30) Foreign Application Priority Data
Apr. 23, 2008 (JP) ................................. 2008-112390

(51) Int. Cl.
*G06F 11/00* (2006.01)
(52) U.S. Cl. ...................................................... 714/4.11
(58) Field of Classification Search ................ 714/2–13, 714/15, 16, 20, 21, 25–28, 37–39, 43, 47
See application file for complete search history.

(56) References Cited

U.S. PATENT DOCUMENTS

| 7,076,691 B1* | 7/2006 | Dobberpuhl et al. ........... 714/13 |
| 7,260,625 B2* | 8/2007 | Sugiura et al. ................ 709/223 |
| 7,353,259 B1* | 4/2008 | Bakke et al. ................... 709/208 |
| 7,444,335 B1* | 10/2008 | Colrain et al. ........................ 1/1 |
| 7,694,166 B1* | 4/2010 | Suggs et al. ...................... 714/4 |
| 2003/0237018 A1* | 12/2003 | Baba ................................. 714/4 |
| 2004/0034807 A1* | 2/2004 | Rostowfske ...................... 714/4 |
| 2005/0015657 A1* | 1/2005 | Sugiura et al. .................... 714/6 |
| 2006/0143498 A1 | 6/2006 | Hatasaki et al. |
| 2007/0136447 A1 | 6/2007 | Nakajima et al. |
| 2007/0180314 A1 | 8/2007 | Kawashima et al. |

FOREIGN PATENT DOCUMENTS
JP          2007-207219 A      8/2007
* cited by examiner

*Primary Examiner* — Nadeem Iqbal
(74) *Attorney, Agent, or Firm* — Mattingly & Malur, PC

(57) ABSTRACT

The invention is to provide a failover method for improving overall reliability of a system including a large number of servers. Priorities set based on operating statuses of respective servers and shared devices capable of communicating with the respective servers in a failover system are stored in a storage portion while the priorities are associated with the respective servers, so that a failure processing portion of a management server retrieves a server based on the priorities and designates the retrieved server as a spare server when a failure occurs in one of the servers.

18 Claims, 15 Drawing Sheets

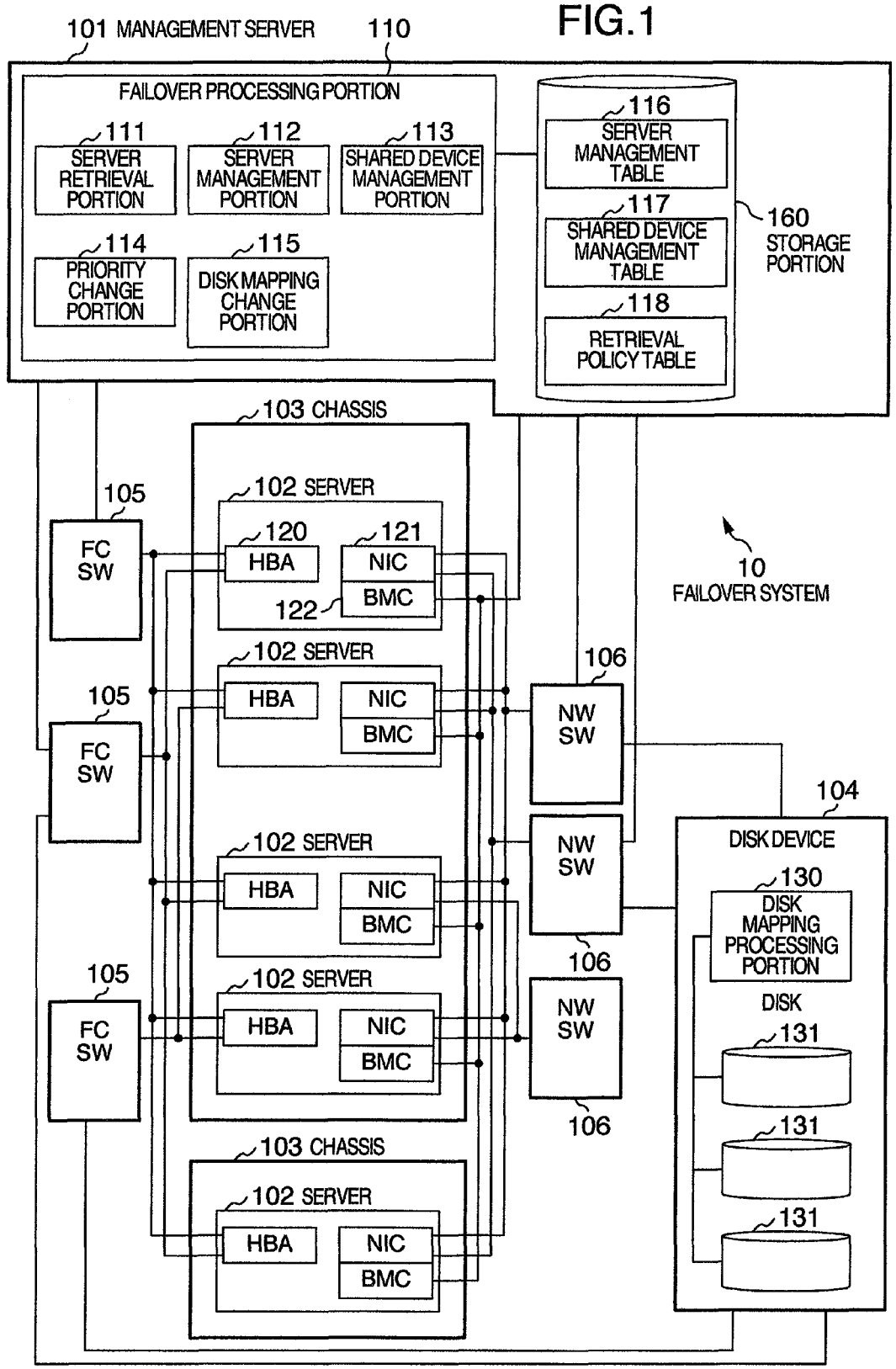

FIG.2

116 SERVER MANAGEMENT TABLE

| SERVER IDENTIFIER | CONFIGURATION INFORMATION | | | SHARED DEVICE INFORMATION | | | | | STATUS | PRIORITY |
|---|---|---|---|---|---|---|---|---|---|---|
| | CPU FREQUENCY | MEMORY CAPACITY | CHASSIS IDENTIFIER | NWSW | | FCSW | | | | |
| | | | | REDUNDANCY | IDENTIFIER | REDUNDANCY | IDENTIFIER | | | |
| S1 | 2GHz | 4GB | BS10000#1 | 2 | NWSW#1, NWSW#2 | 2 | FCSW#1, FCSW#2 | | IN USE | — |
| S2 | 2GHz | 2GB | BS10000#1 | 2 | NWSW#1, NWSW#2 | 1 | FCSW#1 | | IN USE | — |
| S3 | 4GHz | 4GB | BS10000#1 | 1 | NWSW#1 | 2 | FCSW#1, FCSW#3 | | IN USE | — |
| S6 | 2GHz | 4GB | BS10000#1 | 2 | NWSW#1, NWSW#2 | 2 | FCSW#1, FCSW#2 | | FREE | HIGH |
| S7 | 2GHz | 4GB | BS10000#1 | 2 | NWSW#1, NWSW#2 | 1 | FCSW#1 | | FREE | ABOVE NORMAL |
| S8 | 2GHz | 4GB | BS10000#1 | 1 | NWSW#1 | 2 | FCSW#1, FCSW#3 | | FREE | ABOVE NORMAL |
| S9 | 4GHz | 4GB | BS10000#1 | 1 | NWSW#3 | 1 | FCSW#3 | | FREE | NORMAL |
| S10 | 4GHz | 4GB | BS10000#2 | 2 | NWSW#1, NWSW#3 | 2 | FCSW#1, FCSW#2 | | FREE | LOW |
| S11 | 4GHz | 4GB | BS10000#3 | 2 | NWSW#1, NWSW#2 | 2 | FCSW#1, FCSW#2 | | FREE | HIGH |

FIG.3

117 SHARED DEVICE MANAGEMENT TABLE

| SHARED DEVICE IDENTIFIER (301) | TYPE (302) | STATUS (303) | RELEVANT DEVICE (304) |
|---|---|---|---|
| BS1000#1 | CHASSIS | NORMAL | SVP#1, PD#1 |
| BS1000#2 | CHASSIS | ABNORMAL | SVP#2, PD#2 |
| NWSW#1 | NWSW | NORMAL | |
| NWSW#2 | NWSW | NORMAL | |
| NWSW#3 | NWSW | ABNORMAL | |
| FCSW#1 | FCSW | NORMAL | |
| FCSW#2 | FCSW | NORMAL | |
| FCSW#3 | FCSW | ABNORMAL | |
| SVP#1 | SVP | NORMAL | |
| SVP#2 | SVP | ABNORMAL | |
| PD#1 | POWER SUPPLY | NORMAL | |
| PD#2 | POWER SUPPLY | NORMAL | |

FIG.4

118 RETRIEVAL POLICY TABLE

| SERVER IDENTIFIER OF ACTIVE SERVER (401) | RETRIEVAL POLICY (402) |
|---|---|
| S1 | PREFERENCE TO HIGHER PROBABILITY OF OPERATION RECOVERY |
| S2 | PREFERENCE TO SMALLER NUMBER OF DEVICES |
| S3 | PREFERENCE TO HIGHER REDUNDANCY OF DEVICES |
| S4 | PREFERENCE TO THE SAME CHASSIS |
| S5 | PREFERENCE TO ANOTHER CHASSIS |

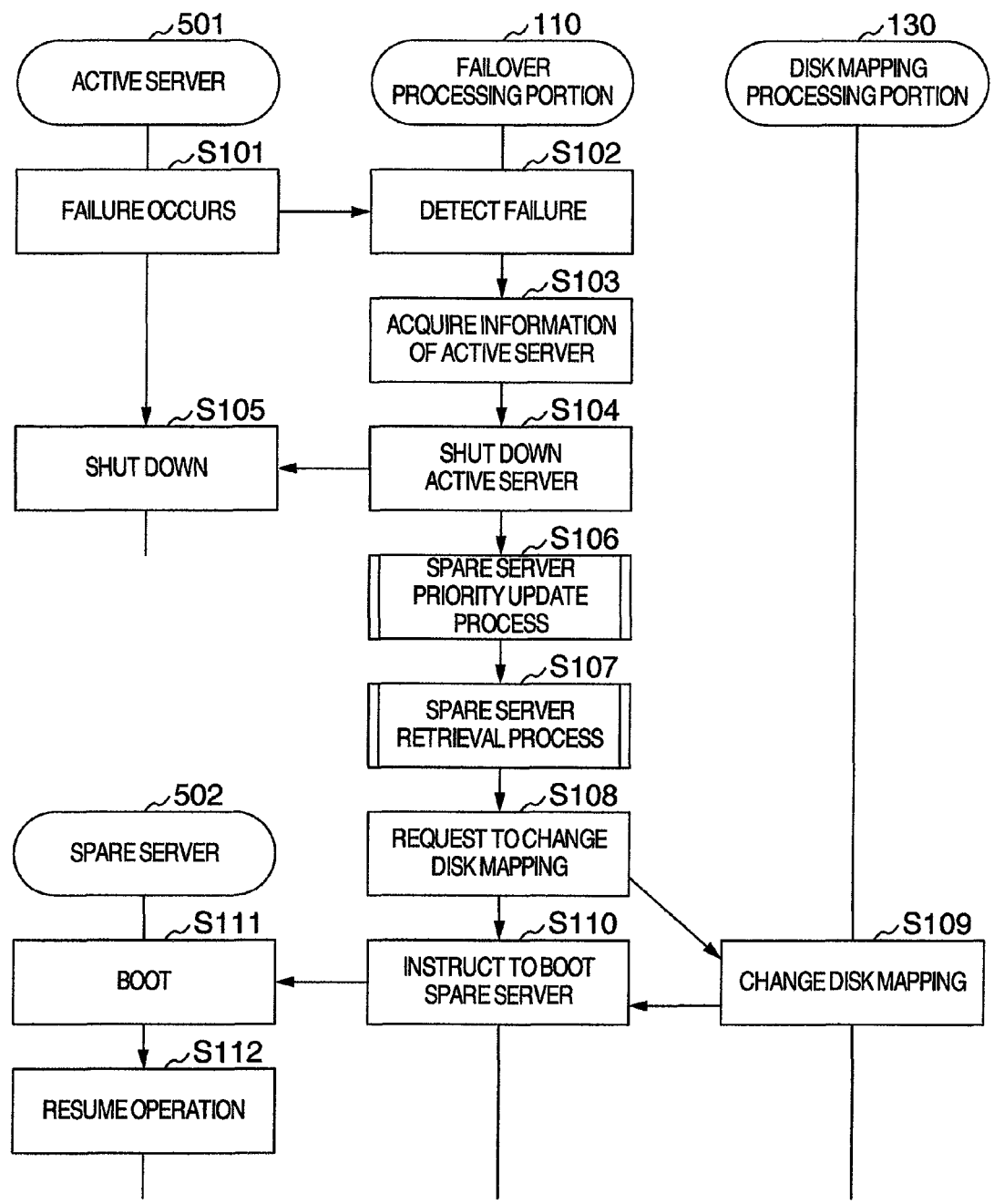

FIG.10

142 PARTITION MANAGEMENT TABLE

| PARTITION IDENTIFIER (1001) | SERVER IDENTIFIER (1002) | STATUS (1003) | PRIORITY (1004) |
|---|---|---|---|
| P1 | S1, S2 | IN USE | — |
| P2 | S3 | IN USE | — |
| P3 | S4, S5, S6 | IN USE | — |
| P4 | S7, S8 | FREE | HIGH |
| P5 | S9, S10 | FREE | NORMAL |

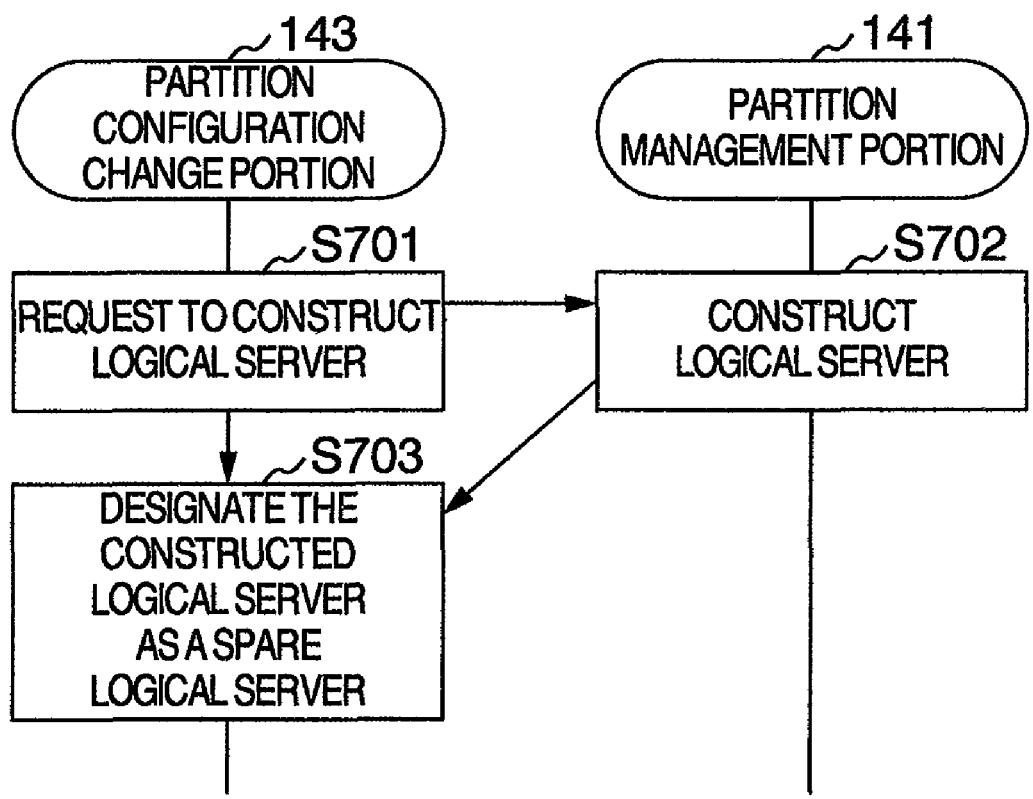

FIG.14

117b SHARED DEVICE MANAGEMENT TABLE

| SHARED DEVICE IDENTIFIER | TYPE | STATUS | RELEVANT DEVICE | NUMBER OF CONNECTIONS | AVERAGE COMMUNICATION SPEED |
|---|---|---|---|---|---|
| BS1000#1 | CHASSIS | NORMAL | SVP#1, PD#1 | 5 | 100Mbps |
| BS1000#2 | CHASSIS | ABNORMAL | SVP#2, PD#2 | 6 | 200Mbps |
| NWSW#1 | NWSW | NORMAL | | 10 | 10Mbps |
| NWSW#2 | NWSW | NORMAL | | 15 | 20Mbps |
| NWSW#3 | NWSW | ABNORMAL | | 20 | 20Mbps |
| FCSW#1 | FCSW | NORMAL | | 10 | 50Mbps |
| FCSW#2 | FCSW | NORMAL | | 15 | 70Mbps |
| FCSW#3 | FCSW | ABNORMAL | | 20 | 70Mbps |
| SVP#1 | SVP | NORMAL | | | |
| SVP#2 | SVP | ABNORMAL | | | |
| PD#1 | POWER SUPPLY | NORMAL | | | |
| PD#2 | POWER SUPPLY | NORMAL | | | |

301　302　303　304　305　306 ately, there is no consideration of configuration information and operating information of devices shared among a plurality of servers such as a power control device for starting up a spare server. For this reason, there is a possibility that a spare server may fail to start up due to a failure or the like in one of shared devices such as NWSWs (Network Switches) or FCSWs (Fibre Channel Switches) connected to respective servers to thereby make it impossible to resume operation. The failover method provided for a computer system requiring high reliability has a problem that there is no suggestion about a function to improve the reliability.

FAILOVER METHOD, PROGRAM, FAILOVER APPARATUS AND FAILOVER SYSTEM

BACKGROUND OF THE INVENTION

1. Field of the Invention

The present invention relates to techniques of a failover method, a program, a failover apparatus and a failover system.

2. Description of the Related Art

In order to improve the availability of a computer system including a large number of servers, there is a method (failover method) in which a plurality of active servers and one or a small number of spare servers are provided, and once a failure occurs in one of the active servers in use, processing of the active server is taken over to another server (spare server) in the computer system. US2006/0143498A1 has disclosed a technique in which when a failure occurs in any one of active servers, a startup disk connected to the active server is reconnected to a standby server and operated from the standby server so that processing of the active server can be taken over to the standby server. US2007/0136447A1 has disclosed another technique in which one or a small number of spare servers are provided for a large number of active servers so that a highly reliable computer system improved in availability can be constructed inexpensively.

In the techniques disclosed in US2006/0143498A1 and US2007/0136447A1, a spare server to take over operation is retrieved from a server management table where server-specific information concerned with a CPU (Central Processing Unit), a memory, etc. is recorded. In the techniques disclosed in US2006/0143498A1 and US2007/0136447A1, a failure detecting function and a spare server retrieving function are provided but a target of retrieval is the server management table where only the server-specific information is recorded. Accordingly, there is no consideration of configuration information and operating information of devices shared among a plurality of servers such as a power control device for starting up a spare server. For this reason, there is a possibility that a spare server may fail to start up due to a failure or the like in one of shared devices such as NWSWs (Network Switches) or FCSWs (Fibre Channel Switches) connected to respective servers to thereby make it impossible to resume operation. The failover method provided for a computer system requiring high reliability has a problem that there is no suggestion about a function to improve the reliability.

The computer system generally requires as high reliability as that of an expensive computer system having a cluster configuration. The computer system requires sufficiently high reliability to take over operation of an active server and resume the operation surely when a failure occurs.

SUMMARY OF THE INVENTION

The present invention is accomplished in consideration of such circumstances. An object of the present invention is to carry out failover to improve overall reliability of a system including a large number of servers.

To achieve the foregoing object of the invention, priorities set based on operating statuses of respective servers and devices capable of communicating with the respective servers in a system are stored in a storage portion while the priorities are associated with the respective servers, so that a processing portion retrieves a server based on the priorities and designates the retrieved server as a spare server when a failure occurs in one of the servers.

According to the invention, it is possible to carry out failover to improve overall reliability of a system including a large number of servers.

BRIEF DESCRIPTION OF THE DRAWINGS

FIG. 1 is a diagram showing a configuration example of a failover system according to a first embodiment of the invention;

FIG. 2 is a view showing a configuration example of a server management table;

FIG. 3 is a view showing a configuration example of a shared device management table;

FIG. 4 is a view showing a configuration example of a retrieval policy table;

FIG. 5 is a diagram showing a flow of a failover process according to the first embodiment;

FIG. 10 is a view showing a configuration example of a partition management table according to the second embodiment;

FIG. 13 is a diagram showing a flow of a partition configuration changing process according to the second embodiment;

FIG. 14 is a view showing a configuration example of a shared device management table according to a third embodiment of the invention;

DETAILED DESCRIPTION OF THE INVENTION

Figure 6:
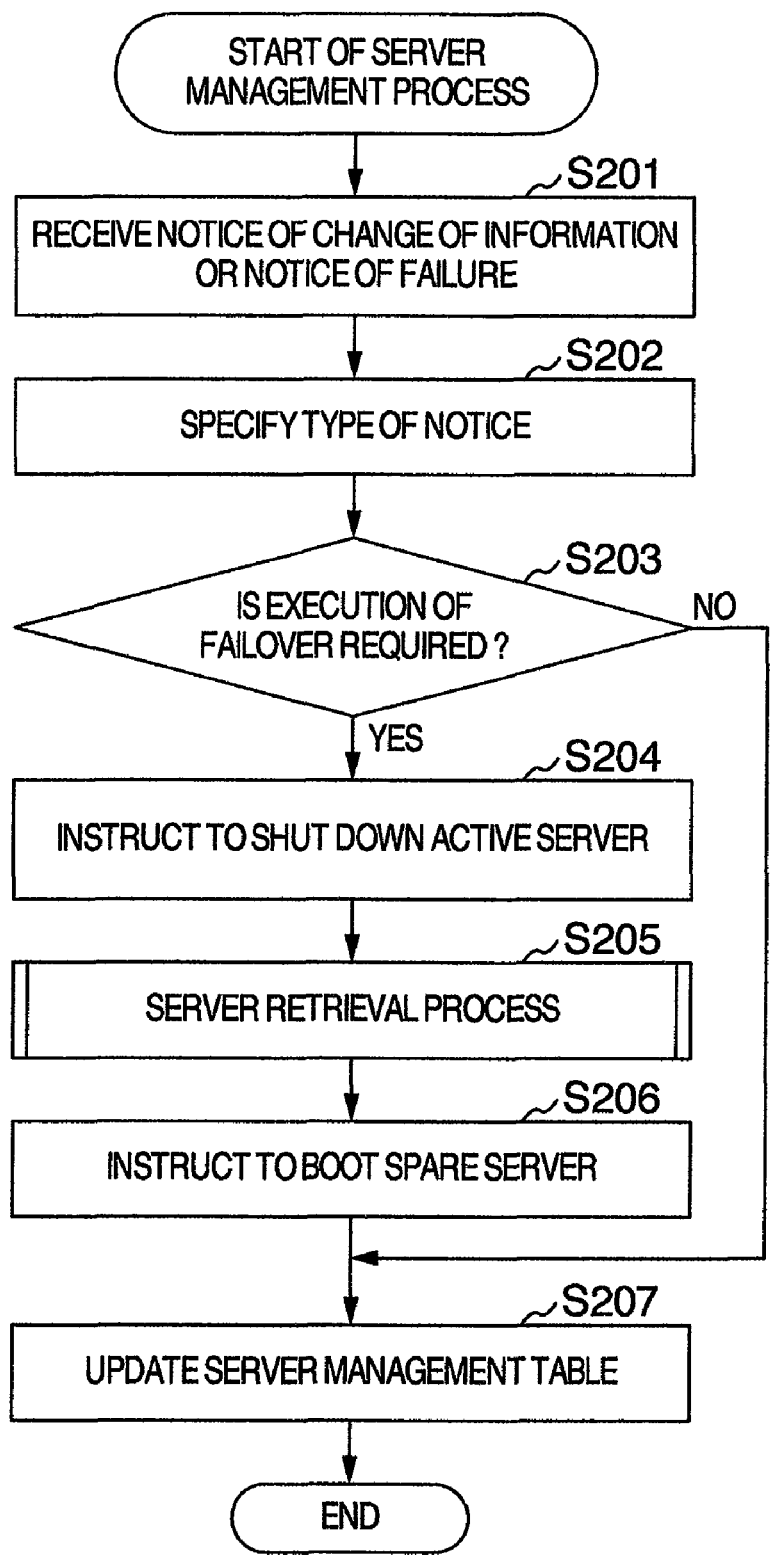
FIG. 6 is a flow chart showing a flow of a server management process in a failover method according to the first embodiment.

Best modes (referred to as "embodiments") for carrying out the present invention will be described below in detail with reference to the suitable drawings.

First Embodiment

Configuration

FIG. 1 is a diagram showing an example of configuration of a failover system according to a first embodiment of the invention.

The failover system 10 (system) according to this embodiment includes a management server 101 (failover apparatus), a plurality of servers 102, a plurality of chassis 103, a plurality of FCSWs 105, and a plurality of NWSWs 106. In the following description of this embodiment, the FCSWs 105 and the NWSWs 106 will be generically called 'shared devices'. The failover system 10 is a computer system in which one server 102 can be connected to a plurality of FCSWs 105 and a plurality of NWSWs 106 so that a redundant configuration to continue operation even on a hardware failure can be employed. The respective servers 102 are connected to the FCSWs 105 through Fibre Channel HBAs (Host Bus adaptors) 120 and connected to the NWSWs 106 through NICs (Network Interface Cards) 121. The FCSWs 105 are further connected to a disk device 104, so that the respective servers 102 can access the disk device 104. The NWSWs 106 are connected to the management server 101 (failover apparatus) managing the failover system 10 and to the disk device 104 via a network. Each of the servers 102 has a built-in BMC (Baseboard Management Controller) 122. The BMC 122 is connected to the management server 101 via the network. In this manner, the management server 101 can perform hardware status monitoring and power supply controlling of the respective servers 102.

The management server 101 performs status monitoring and, if necessary, controlling of the servers 102, the chassis 103, the disk device 104, the FCSWs 105 and the NWSWs 106 via the network. The management server 101 has a failover processing portion (110) (processing portion). The failover processing portion 110 has functions such as reception of a notice of failure from the BMC 122 when a failure occurs in one of the servers 102, control of power supply to the BMC 122, control of a disk mapping processing portion 130 of the disk device 104, etc. The failover processing portion 110 has a server retrieval portion 111 for retrieving a spare server by using priorities and retrieval policies which will be described later, a server management portion 112, a disk mapping change portion 115, a shared device management portion 113 for monitoring shared devices, a priority change portion 114 for changing priorities, and a storage portion 160 for storing information. The 'priorities' and 'retrieval policies' mentioned here are indices to selection of a server 102 from servers 102 as candidates for a spare server when a failure occurs in an active server. The priorities and retrieval policies will be described later in detail.

The storage portion 160 has a server management table 116, a shared device management table 117, and a retrieval policy table 118. The server management table 116, the shared device management table 117 and the retrieval policy table 118 will be described later in detail with reference to FIGS. 2 to 4.

The server management portion 112 monitors statuses of the servers 102 to perform operating status monitoring, failure monitoring and power supply controlling for the servers 102. When a failure occurs in one of the servers 102 or when a failure occurs in one of the BMCs 112, the servers 102, etc., a notice of occurrence of the failure is sent to the server management portion 112. The server management portion 112 further manages shared device information as information of shared devices connected to the servers 102 and redundancies of the shared devices by communicating with the shared device management portion 113. The server management portion 112 further has a function for managing priorities of free servers 102 by communicating with the priority change portion 114.

The shared device management portion 113 has a function for monitoring statuses of shared devices such as the chassis 103, the FCSWs 105, the NWSWs 106, etc. to thereby perform operating status and failure monitoring of the shared devices.

The server retrieval portion 111 has a function for retrieving a server 102 to take over operation and designating the retrieved server 102 as a spare server when a failure occurs in an active sever.

The disk mapping processing portion 130 of the disk device 104 has a function for associating disks 131 with the HBAs 120 mounted in the servers 102. Specifically, disks 131 allowed to be accessed by the servers 102 are limited to achieve a security function. In this embodiment, an OS (Operating System), job applications, etc. are stored in each disk 131 in the disk device 104 so that the servers 102 use the disks 131 in the disk device 104 as boot disks.

The server management table 116, the shared device management table 117 and the retrieval policy table 118 will be described below with reference to FIGS. 2 to 4 in connection with FIG. 1.

(Server Management Table)

FIG. 2 is a view showing an example of configuration of the server management table.

The server management table 116 stores a list of servers 102 to be managed by the failover processing portion 110, configuration information, priorities and usage statuses of the respective servers 102, and information of shared devices connected to the respective servers 102.

A server identifier which is an identifier of each server 102 is stored in a column 201. Any information can be used as the server identifier if the information can identify each server 102. A CPU frequency of each server 102 is stored in a column 202. The capacity of the memory provided in each server 102 is stored in a column 203. A chassis identifier which is an identifier of the chassis 103 where each server 102 is mounted is stored in a column 204.

The redundancy of NWSWs 106 connected to each server 102 is stored in a column 205. The 'redundancy' is the number of NWSWs connected to each server 102. As the redundancy increases, the server 102 becomes strong against failure in one of the NWSWs 106. When, for example, a server 102 is connected to two NWSWs 106 each of which supports a redundant configuration, '2' is set in the column 205 (redundancy). A column 206 shows NWSW identifiers of the NWSWs 106 connected to each server 102. NWSW identifiers corresponding to the number of NWSWs connected to each server 102 can be stored in the column 206. When the redundancy of a server 102 connected to two NWSWs 106 is set at '1' in the column 205, this shows that the server 102 is connected to two NWSWs 106 which are in a degenerative operating state or support no redundant configuration.

The redundancy of FCSWs 105 connected to each server 102 is stored in a column 207. When, for example, a server 102 is connected to two FCSWs 105 each of which supports a redundant configuration, '2' is set in the column 207. A column 208 shows FCSW identifiers of the FCSWs 105 connected to each server 102. FCSW identifiers corresponding to the number of FCSWs connected to each server 102 can be stored in the column 208. When the redundancy of a server 102 connected to two FCSWs 105 is set at '1' in the column 207, this shows that the server 102 is connected to two FCSWs 105 which are in a degenerative operating state or support no redundant configuration.

Information about the usage status of each server 102 is stored in a column 209. For each active server which is a currently running server 102, 'in use' is stored in the column 209. For each spare server which is a currently non-running server 102, 'free' is stored in the column 209. A column 210 shows priority of each spare server. The priorities of the spare servers are used as conditions for retrieving a server 102 to take over operation when a failure occurs in an active server. For example, the priorities are classified into 'high', 'above normal', 'normal', 'below normal' and 'low'. High priority indicates that the probability of operation recovery at resumption of operation and the availability after resumption of operation are high.

Incidentally, the priorities are calculated by the priority change portion 114 receiving a notice of priority change from another constituent portion in the failover processing portion 110 and are updated by the server management portion 112. However, the initial values of priorities may be set by the user through the input portion. When, for example, devices connected to a server 102 operate stably and each of the devices supports a redundant configuration, the priority change portion 114 determines that both recovery probability and availability are the highest, and sets the priority as 'high'. When, for example, a part of the shared devices support a redundant configuration, the priority change portion 114 sets the priority as 'above normal'. When, for example, the shared devices support no redundant configuration but operate stably, the priority change portion 114 sets the priority as 'normal'. When, for example, a shared region for executing starting-up of the spare server at the time of resuming operation is broken down, the priority change portion 114 sets the priority as 'low'. Although the probability of operation recovery is used as a criterion for determining the priority in the aforementioned procedure, the priority may be set based on another criterion.

(Shared Device Management Table)

FIG. 3 is a view showing an example of configuration of the shared device management table.

A list of shared devices to be managed by the failover processing portion 110 and configuration information and statuses of the shared devices are stored in the shared device management table 117.

A shared device identifier which is an identifier of each shared device is stored in a column 301. Any information can be used as the shared device identifier if the information can identify each shared device. Information about the type of each shared device is stored in a column 302. The information about the type of each shared device includes not only information of a chassis 103, an FCSW 105 and an NWSW 106 but also information of a service processor (SVP), a power supply etc. mounted in the chassis 103. Information about an operating state of each shared device is stored in a column 303. Although examples of the information stored in the column 303 are 'normal' and 'abnormal', an operating time etc. of each shared device may be stored in the column 303. A result of confirmation of status monitoring by the shared device management portion 113 or a result of status notification sent from each shared device is stored in the column 303. Information of other shared devices (relevant devices) mounted in each shared device is stored in a column 304. The example shown in FIG. 3 shows that a service processor having a shared device identifier 'SVP#1' and a power supply having a shared device identifier 'PD#1' are mounted in a chassis 103 having a shared device identifier 'BS 1000#1'.

(Retrieval Policy Table)

FIG. 4 is a view showing an example of configuration of the retrieval policy table.

Each policy indicating a requirement satisfied by a spare server is stored in the retrieval policy table 118.

A server identifier of an active server in use is stored in a column 401. The server retrieval portion 111 acquires information of the server 102 from the server management table 116 shown in FIG. 2 by using the server identifier as a retrieval key. A retrieval policy indicating a requirement which should be satisfied by a spare server is stored in a column 402. The retrieval policy can be changed by the user. For example, a GUI (Graphic User Interface), a command program, a setting file, etc. are provided so that the retrieval policy can be designated. The retrieval policy is designed so that a plurality of retrieval policies can be designated for one server 102 and order of priority of the policies can be designated.

(Overall Processing)

A failover method according to the first embodiment will be described below with reference to FIGS. 5 to 8 in connection with FIGS. 1 to 4.

FIG. 5 is a chart showing a flow of failover processing according to the first embodiment.

In FIG. 5, a server 102 used as an active server is described as an active server 501 while a server 102 selected as a spare server is described as a spare server 502.

First, when a failure occurs in the active server 501 (S101), a BMC 122 mounted in the active server 501 or an agent program running on the active server 501 detects occurrence of the failure and sends a notice of the failure to the failover processing portion 110 of the management server 101. After the failover processing portion 110 detects occurrence of the failure in the active server 501 (S102), the failover processing portion 110 acquires information about hardware configuration, etc. of the active server 501 where the failure occurs (S103). The information is acquired from the server management table 116 (FIG. 2).

Then, the failover processing portion 110 instructs the active server 501 to shut down (S104). The reason of shutdown is that it is necessary to make preparation for wrong I/O (Input/Output) issued from an OS and operating applications which may run in an unstable state if the active server 501 runs as it is. Moreover, there is a possibility that data of the OS and operating applications will be destroyed by competition of disks 131 in the disk device 104. Moreover, servers 102 having the same IP address will exist if the active server 501 is still running when operation is taken over to the spare server 502. The shutdown of the active server 501 is required for preventing this. Incidentally, when dump processing is performed in the active server 501, the shutdown will be executed after waiting for completion of the dump processing. In addition, the failover processing portion 110 may request the active server 501 to start dump processing.

Upon reception of the shutdown instruction, the active server 501 executes shutdown processing of itself (S105). If the shutdown processing is impossible, the failover processing portion 110 executes forced power-off of the active server 501. The forced power-off is executed based on an instruction given to the BMC 122 mounted in the server 102.

After the failover processing portion 110 confirms the shutdown of the active server 501, the failover processing portion 110 performs a priority updating process for the spare server 502 at the point of time of occurrence of the failure (S106). The priority updating process is achieved in such a manner that the priority change portion 114 determines priorities in the server management table 116 based on information stored in the server management table 116 and the shared device management table 117 and the server management portion 112 updates the priorities. The priority updating process will be described later in detail with reference to FIG. 8. Incidentally, the priority updating process at this timing is to acquire the latest priorities. The process in the step S106 can be dispensed with.

Then, the failover processing portion 110 performs a process of retrieving a server 102 (spare server 502) to take over operation of the active server 501 (S107). The process of retrieving the spare server 502 is achieved in such a manner that the server retrieval portion 111 searches the server management table 116 by using the information acquired in the step S103 and a retrieval policy as a retrieval condition. The process of retrieving the spare server 502 will be described later in detail with reference to FIG. 7.

As a result of the retrieval in the step S107, the failover processing portion 110 detects a server 102 matching with the retrieval condition as the spare server 502. Then, the disk mapping change portion 115 of the failover processing portion 110 cancels mapping of a disk 131 as mapping for the active server 501, and requests the disk mapping processing portion 130 of the disk device 104 to change the mapping to mapping for the spare server 502 (S108). The disk mapping processing portion 130 of the disk device 104 executes the requested disk mapping change (S109). That is, the disk 131 of the disk device 104 allocated to the active server 501 is re-allocated to the detected spare server 502. Then, the failover processing portion 110 instructs the detected spare server 502 to start up (S110). The instructed spare server 502 starts up (S111) and the OS and operating applications start up in the spare server 502 to thereby resume operation (S112).

Processing shown in FIG. 5 will be described below as detailed and general processing. That is, processing shown in FIG. 5 is triggered by occurrence of the failure in the active server 501 whereas processing shown in FIG. 6 is triggered not only by occurrence of the failure in the active server 501 but also by another factor.

FIG. 6 is a flow chart showing a flow of a server management process in the failover method according to the first embodiment.

First, the server management portion 112 receives configuration information and notification of the change of operating information (information change notification) from another constituent member of the failover processing portion 110 or failure notification from a server 102 where a failure occurs (S201).

Then, the server management portion 112 specifies the type of the notification based on contents of the received notification (S202).

Then, the server management portion 112 determines whether or not it is necessary to execute failover, based on the notification type specified in the step S202 (S203). For example, the server management portion 112 determines whether or not contents of the notification are concerned with the operation of the failover system 10 such as occurrence of a failure in the server 102. A criterion for determination may be set in advance by the user through an input portion not shown.

When the step S203 results in that it is not necessary to execute failover (S203→No), the server management portion 112 brings processing to step S207.

When the step 203 results in that it is necessary to execute failover (S203→Yes), the server management portion 112 instructs the active server to shut down (S204).

The server management portion 112 starts the server retrieval portion 111 so that the started server retrieval portion 111 executes a server retrieval process (S205). The server retrieval process will be described later in detail with reference to FIG. 7.

Then, the server management portion 112 designates the server 102 detected in the step S205 as a spare server and instructs the spare server to start up (S206).

Successively, the server management portion 112 updates the server management table 116 based on contents of the notification received in the step S201 and results of execution of the steps performed up to now (i.e. the steps S201 and S202) in the server management portion 112 (S207). Although there is no priority updating process shown in processing of FIG. 6, a priority updating process which will be described later with reference to FIG. 8 may be provided between the steps S204 and S205.

(Server Retrieval Process)

Figure 7:
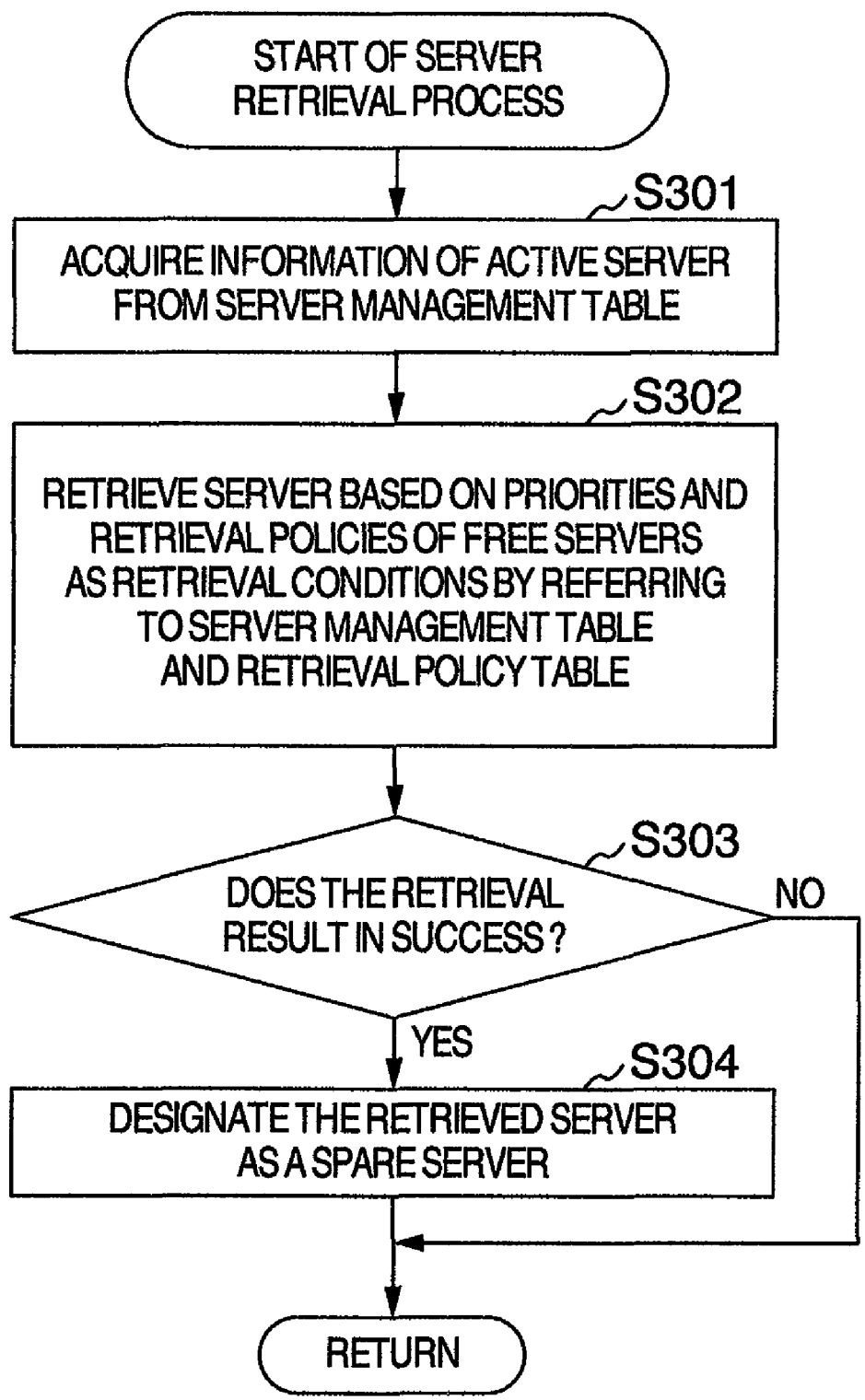
FIG. 7 is a flow chart showing a flow of a server retrieval process according to the first embodiment.

FIG. 7 is a flow chart showing a flow of a server retrieval process in the first embodiment. Incidentally, the process shown in FIG. 7 is for detailed description of the process in the step S107 in FIG. 5 and the step S205 in FIG. 6.

First, the server retrieval portion 111 acquires information of each active server from the server management table 116 (FIG. 2) (S301). On this occasion, the server retrieval portion 111 extracts information based on the server identifier of the active server.

Then, the server retrieval portion 111 retrieves free servers 102 by referring to the column 209 (FIG. 2) of the server management table 116 and further retrieves the retrieval policy of the active server by referring to the retrieval policy table 118 (FIG. 4) with use of the identifier of the active server as a key. The server retrieval portion 111 further retrieves a server 102 to satisfy the retrieved retrieval policy condition from the retrieved free servers 102. That is, the server retrieval portion 111 retrieves a server 102 based on priorities and retrieval policies of free servers 102 by referring to the server management table 116 and the retrieval policy table 118 (S302).

On this occasion, the server retrieval portion 111 retrieves an optimum spare server based on a combination of priority and retrieval policy of each free server 102. For example, when a failure occurs in a server 'S1' having 'preference to a higher probability of operation recovery' set as its retrieval policy in FIG. 4, the server retrieval portion 111 detects a free server 'S6' (in the column 201 of FIG. 2) of the highest priority (based on the 'preference to a higher probability of operation recovery') from the server management table 116 in FIG. 2. On the other hand, when a failure occurs in a server 'S5' (in the column 201 of FIG. 2) having 'preference to a server placed in another chassis' as its retrieval policy in FIG. 4, the server retrieval portion 111 detects two free servers 'S10' and 'S11' mounted in another chassis 103 from the server management table 116 in FIG. 2 and further detects a higher priority server 'S11' from the two free servers 'S10' and 'S11'.

After the step S302, the server retrieval portion 111 determines whether detection of a server 102 succeeded or not (S303). That is, the server retrieval portion 111 determines whether or not there is any server 102 matching with the retrieval condition (matching with the retrieval policy).

When the detection succeeded (S303→Yes), the server retrieval portion 111 designates the detected server 102 as a spare server (S304) and the failover processing portion 110 brings processing to the step S108 in FIG. 5 or the step S206 in FIG. 6.

When detection did not succeed (S303→No), the failover processing portion 110 terminates processing. That is, the failover processing portion 110 determines that failover failed, and does not perform processing any more.

(Priority Change Process)

Figure 8:
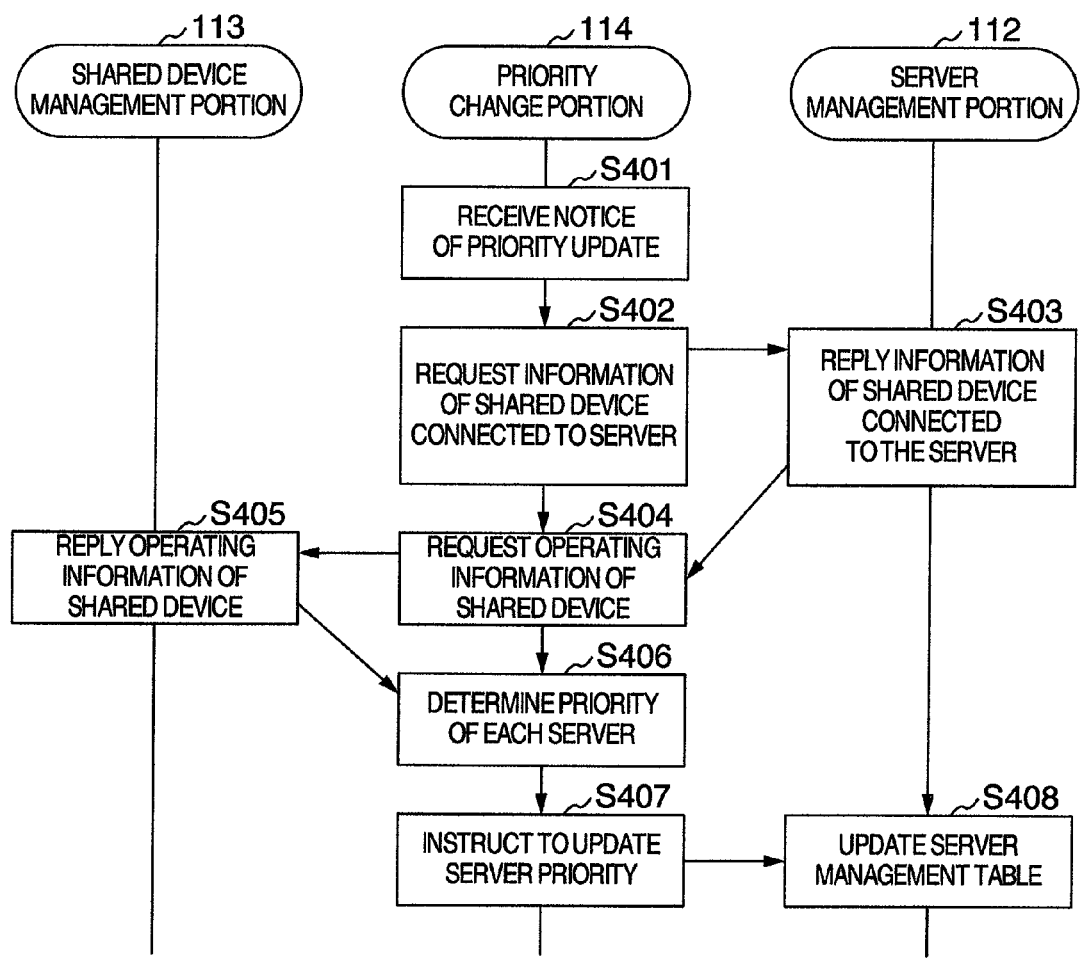
FIG. 8 is a diagram showing a flow of a priority change process according to the first embodiment.

FIG. 8 is a chart showing a flow of a priority change process in the first embodiment. The process shown in FIG. 8 is for detailed description of the step S106 in FIG. 5.

The process shown in FIG. 8 is triggered not only by occurrence of a failure in an active server as described with reference to FIG. 5 but also by start-up of the management server 101, change of the configuration of the failover system 10, change of the operating statuses of the respective servers 102 and shared devices, etc.

First, the priority change portion 114 receives priority change notification from another constituent member of the failover processing portion 110 (S401). The priority change notification contains the server identifier of a server 102 where a failure occurs. The priority change notification may be given from the server management portion 112 in accordance with occurrence of a failure in an active server, start-up of the management server 101 or change of the configuration of the failover system 10 or may be given from the server management portion 112 and the shared device management portion 113 in accordance with change of the operating statuses of the respective servers 102 and shared devices.

Then, the priority change portion 114 requests the server management portion 112 to send information of shared devices connected to at least one server 102 as a subject of priority change (S402). The request sent in the step S402 contains the server identifier of each corresponding server 102.

Upon reception of the request, the server management portion 112 sends shared device information such as shared device identifiers of shared devices connected to the server 102, respective redundancies of the shared devices, etc. back to the priority change portion 114 (S403). The server management portion 112 acquires information of shared devices corresponding to the server identifier by searching the server management table 116 with use of the server identifier contained in the request sent from the priority change portion 114 as a key.

Upon reception of the shared device information, the priority change portion 114 requests the shared device management portion 113 to send operating information of the shared devices (S404). The request sent in the step S404 contains shared device identifiers contained in the shared device information received in the step S403.

Upon reception of the request, the shared device management portion 113 sends operating information of the shared devices back to the priority change portion 114 (S405). The shared device management portion 113 acquires operating information corresponding to each shared device identifier by searching the shared device management table 117 with use of each shared device identifier contained in the request as a key.

Upon reception of the operating information of the shared devices, the priority change portion 114 determines the priority of each server 102 based on the operating information of the shared devices and the redundancies of the shared devices sent in the step S403 (S406). Determination of the priority will be described later specifically.

Then, the priority change portion 114 instructs the server management portion 112 to update the priority of each server 102 (S407). Specifically, the priority change portion 114 sends a combination of each server identifier sent in the step S403 and a corresponding priority determined in the step S406 as paired information to the server management portion 112.

The server management portion 112 instructed by the priority change portion 114 updates the 'priority' column 210 of the server management table 116 (S408).

Specific description about determination of the priority will be described here.

For example, when the priority change portion 114 receives notification of priority update of a server 'S10' shown in FIG. 2 in the step S401, the priority change portion 114 in the step S402 requests the server management portion 112 to send shared device information containing the server identifier 'S10'.

Then, the server management portion 112 acquires shared device information such as identifiers 'BS1000#2', 'NWSW#1', 'NWSW#2', 'FCSW#1' and 'FCSW#2' of shared devices connected to the server 102 having the server identifier 'S10' by referring to the column 204 ('chassis'), the column 206 ('NWSW connection destination') and the column 208 ('FSCW connection destination') in the server management table 116 (FIG. 2) with use of the server identifier 'S10' contained in the request as a retrieval key. Then, in step 403, the server management portion 122 sends the acquired shared device information back to the priority change portion 114.

Then, in step S404, the priority change portion 114 requests the shared device management portion 113 to send operating statuses of the shared devices. The request contains shared device identifiers 'BS1000#2', 'NWSW#1', 'NWSW#2', 'FCSW#1' and 'FCSW#2' sent back in the step S403. The shared device management portion 113 acquires the column 303 ('status of shared device') of the shared device management table 117 with use of the shared device identifiers as retrieval keys, and sends a combination of the status of each shared device acquired in the step S405 and a corresponding shared device identifier as paired information (shared device operating information) back to the priority change portion 114.

In step S406, the priority change portion 114 determines priority based on the operating information and redundancy of each shared device sent back. In this example, because the shared device identifier 'BS1000#2' is abnormal (see FIG. 3), the priority change portion 114 determines the priority of the server 102 having the server identifier 'S10' as 'low'. Then, in step S407, the priority change portion 114 requests the server management portion 112 to update priority so that the 'priority' column of the server management table 116 (FIG. 2) corresponding to the server identifier 'S10' is updated to 'low'. Then, in step S408, the server management portion 112 changes the column 210 of the server management table 116 (FIG. 2) corresponding to the server identifier 'S10' to 'low'.

Incidentally, when, for example, all operating statuses of shared devices connected to the server 102 are 'normal' and all redundancies of the shared devices are '2' or higher, the priority of the server 102 is designated as 'high'. When, for example, all operating statuses of shared devices connected to the server 102 are 'normal' and all redundancies of the shared devices are '1', the priority of the server 102 is designated as 'above normal'.

According to the first embodiment, overall reliability of the system can be improved because a spare server is determined based on priorities in consideration of operating information and configuration information of shared devices connected to each server 102 at the time of occurrence of a trouble concerned with operation of the failover system 10, such as a failure in a shared device. More specifically, a spare server having the highest probability of operation recovery can be detected from all free servers 102 in the failover system 10 at the time of occurrence of a failure in an active server.

Second Embodiment

Configuration

A second embodiment of the invention will be described below with reference to FIGS. 9 to 13.

Figure 9:
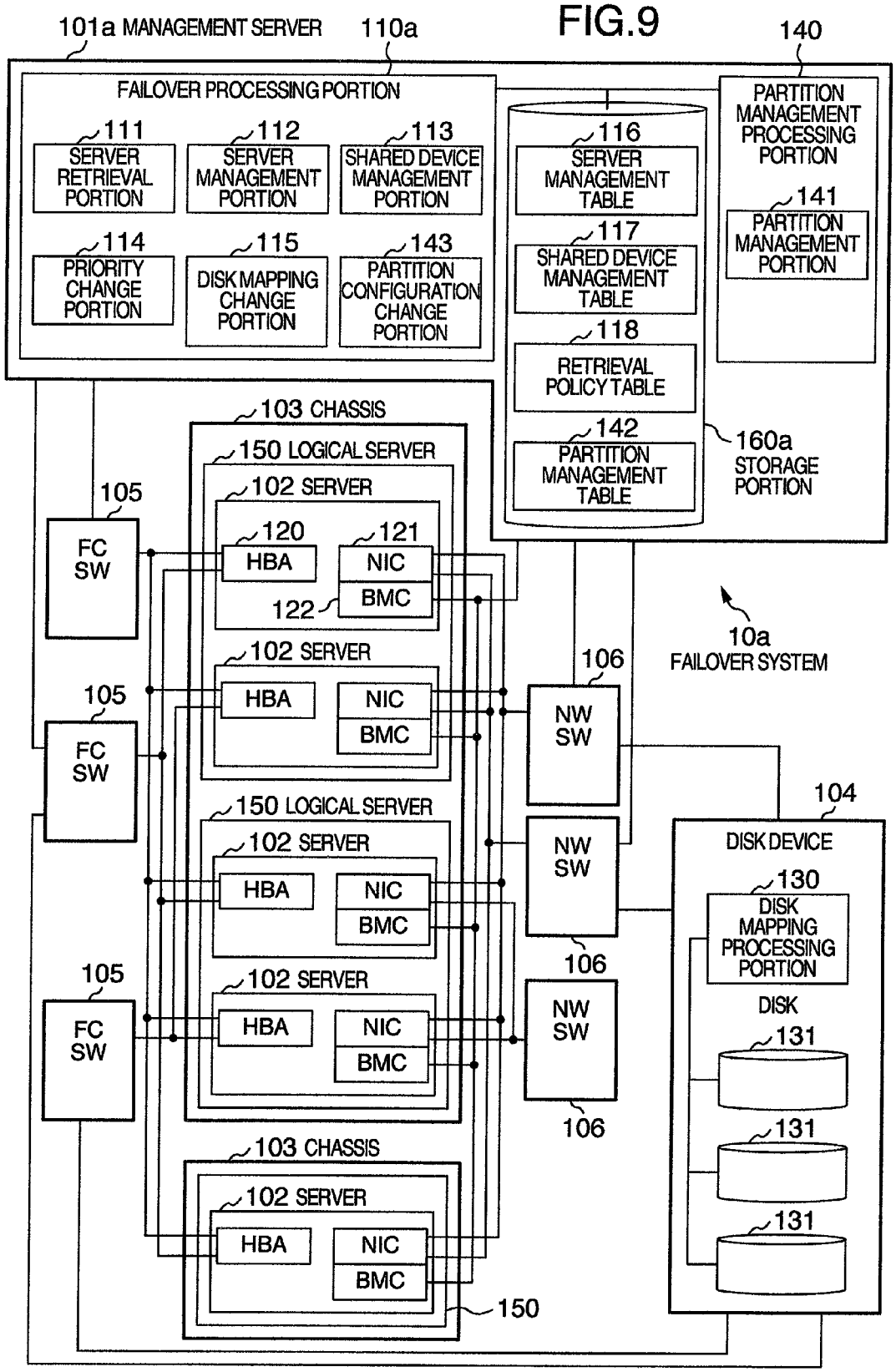
FIG. 9 is a diagram showing a configuration example of a failover system according to a second embodiment of the invention.

FIG. 9 is a diagram showing an example of configuration of a failover system according to the second embodiment. In FIG. 9, constituent parts the same as those in FIG. 1 are referred to by numerals the same as those in FIG. 1 and description thereof will be omitted. The failover system 10a according to the second embodiment is designed so that a spare logical server 150 is formed in accordance with partition configuration of each active logical server 150. As shown in FIG. 10, the concept 'logical server 150' means at least one server 102 (in most cases, a plurality of servers 102) apparently operated as one server. Or one server 102 may be operated as a plurality of servers. The point of difference of the failover system 10a from the failover system 10 according to the first embodiment in FIG. 1 lies in that a partition management processing portion 140 including a partition management portion 141 is added to the management server 101a, a partition management table 142 is added to the storage portion 160a and a partition configuration change portion 143 is added to the failover processing portion 110a.

The partition management processing portion 140 has a function of partition control such as creation of each logical server 150, change of configuration of the logical server 150 and deletion of the logical server 150. The partition management portion 141 has a function of managing the current configuration of the logical servers 150 by referring to the partition management table 142. The partition configuration change portion 143 has a function of constructing a partition for a spare logical server 150 automatically by cooperating with the partition management portion 141.

The partition management table 142 will be described later in detail with reference to FIG. 10.

(Partition Management Table)

The partition management table 142 will be described below with reference to FIG. 10 in connection with FIG. 9.

FIG. 10 is a view showing an example of configuration of the partition management table according to the second embodiment.

Each partition identifier is stored in a column 1001 of the partition management table 142. Any information can be used as the partition identifier if the information can specify one partition corresponding to one logical server 150. The server identifier of each server 102 forming one logical server 150 is stored in a column 1002. One or a plurality of server identifiers can be stored in the column 1002. Information indicating whether each logical server 150 is in use or free is stored in a column 1003. For an operative logical server 150 (active logical server), 'in use' is stored in the column 1003. For a free logical server 150 (spare logical server), 'free' is stored in the column 1003. Priority of each spare logical server 150 is stored in a column 1004. The priority is used as a condition for retrieving a logical server 150 to take over operation when a failure occurs in an active logical server 150. The priority is automatically calculated by the priority change portion 114 based on respective priorities of servers 102 forming the logical server 150.

(Overall Processing)

A failover method according to the second embodiment will be described below with reference to FIGS. 11 to 13 in connection with FIGS. 2 to 4 and FIGS. 9 and 10.

Figure 11:
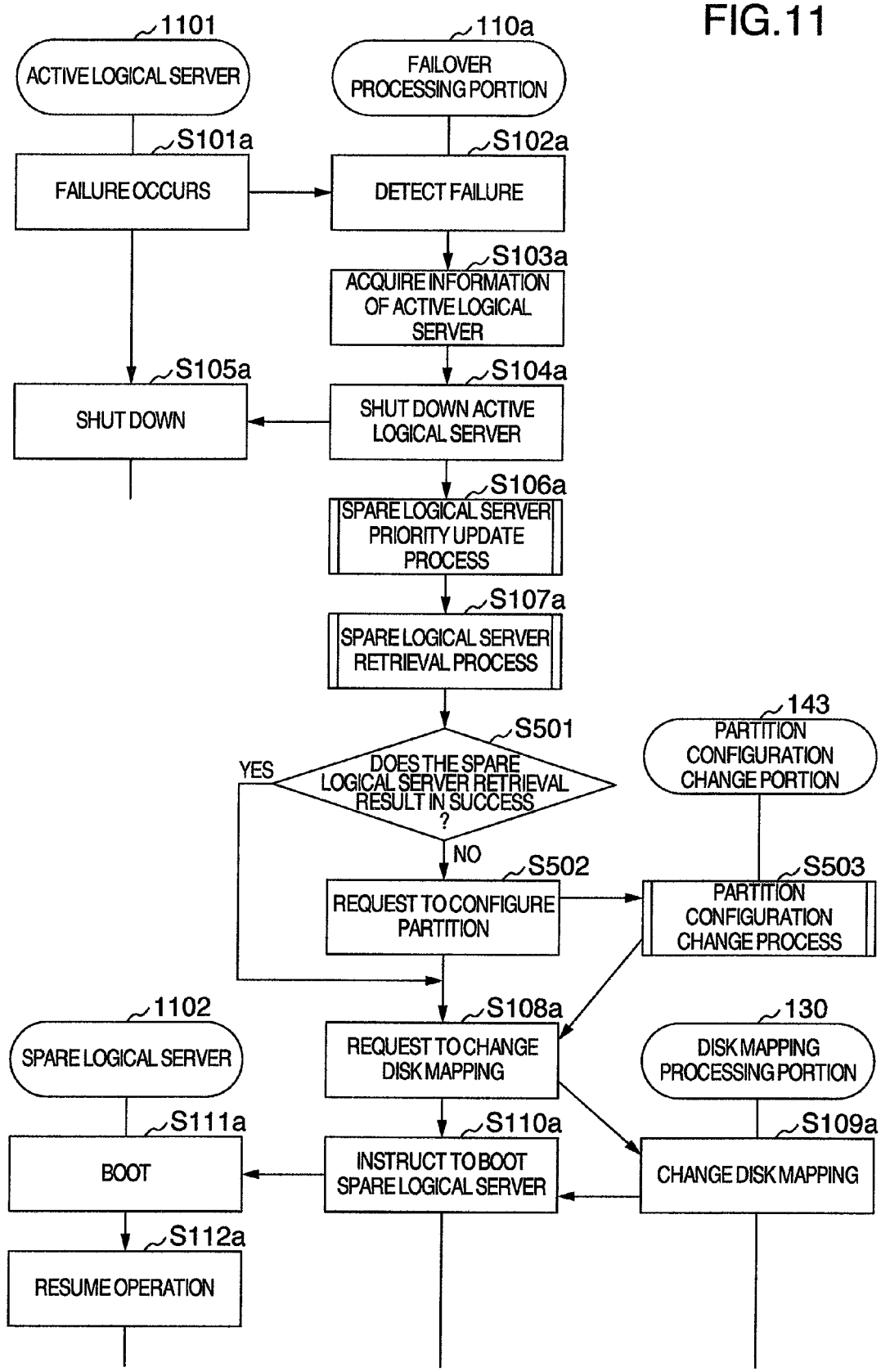
FIG. 11 is a diagram showing a flow of a failover process according to the second embodiment.

FIG. 11 is a chart showing a flow of failover processing according to the second embodiment.

In FIG. 11, a logical server 150 used as an active logical server is referred to as 'active logical server 1101' whereas a logical server 150 selected as a spare logical server is referred to as 'spare logical server 1102'.

Description about steps S101a to S105a and steps S108a to S112a in FIG. 11 will be omitted because these steps are the same as the steps S101 to S105 and the steps S108 to S112 in FIG. 5 except that each server 102 is replaced by each logical server 150. Incidentally, a priority updating process for a spare logical server 1102 in step S106a is performed in the following procedure. First, the priority change portion 114 acquires server identifiers stored in the column 1002 of the partition management table 142 (FIG. 10). Then, the priority change portion 114 acquires priorities corresponding to the acquired server identifiers from the server management table 116 (FIG. 2) and determines priorities in accordance with the server identifiers corresponding to the column 1002 of the partition management table 142 based on the acquired priorities.

For example, the priority of a logical server 150 formed from two servers 102 having 'high' priority and 'normal' priority respectively is set as 'normal'. That is, the priority of a corresponding logical server 150 is set as 'high' when all priorities are 'high'. The priority of corresponding logical server 150 is set as 'normal' or 'above normal' when at least one priority is 'normal' or 'above normal' and other priorities are 'high'. The priority of a corresponding logical server 150 is set as 'low' when at least one priority is 'low'.

The user can change a criterion as to whether the priority of a highest-priority server 102 is set as the priority of the logical server 150 or whether the priority of a lowest-priority server 102 is set as the priority of the logical server 150. For example, the user can designate a policy for setting the priority of the logical server 150 through a GUI, a command program, a setting file, etc.

Because a retrieval process for retrieving a spare logical server 1102 in step S107a will be described later with reference to FIG. 12, processing in steps S501 to S503 in FIG. 11 will be described here.

The failover processing portion 11a determines whether or not a free logical server 150 (spare logical server 1102) having the same partition configuration as that of the active logical server 1101 is detected as a result of the processing in the step S107a which will be described later with reference to FIG. 12 (S501).

When the step S501 results in that a free logical server 150 is detected (S501→Yes), the failover processing portion 11a requests the disk mapping processing portion 130 of the disk device 104 to change disk mapping so that disk mapping to the active logical server 1101 should be canceled and the mapping to the active logical server 1101 on disks 131 of the disk device 104 should be changed to mapping to the detected free logical server 150 (spare logical server 1102) (S108a).

When the step S501 results in that there is no free logical server 150 detected (S501→No), the failover processing portion 110a retrieves a combination of servers 102 capable of constructing a logical server 150 having the same partition configuration as that of the active logical server 1101. When, for example, the active logical server 1101 is formed from two servers 102, the failover processing portion 110a retrieves two servers 102 capable of constructing such a logical server 150 by referring to the server management table 116 (FIG. 2). When there are two servers 102 detected, processing goes to step S502 in which the failover processing portion 110a requests the partition management processing portion 140 to form a logical server 150 from the detected servers 102. That is, the failover processing portion 110a sends a partition configuration request containing information about the set of detected servers 102 to the partition management processing portion 140 (S502). When the failover processing portion 110a acquires respective priorities of the detected servers 102 from the server management table 116, the failover processing portion 110a further requests the partition configuration change portion 143 to perform reconfiguration inclusive of resetting of the priority of the logical server 150 in accordance with the priorities of the detected servers 102.

Upon reception of the request, the partition configuration change portion 143 executes a partition configuration change process (S503). The partition configuration change process in the step S503 will be described later with reference to FIG. 13.

After completion of the partition configuration change process, the partition configuration change portion 143 sends notification of the completion to the failover processing portion 110a. The failover processing portion 110a performs processing in step S108a.

(Spare Logical Server Retrieval Process)

Figure 12:
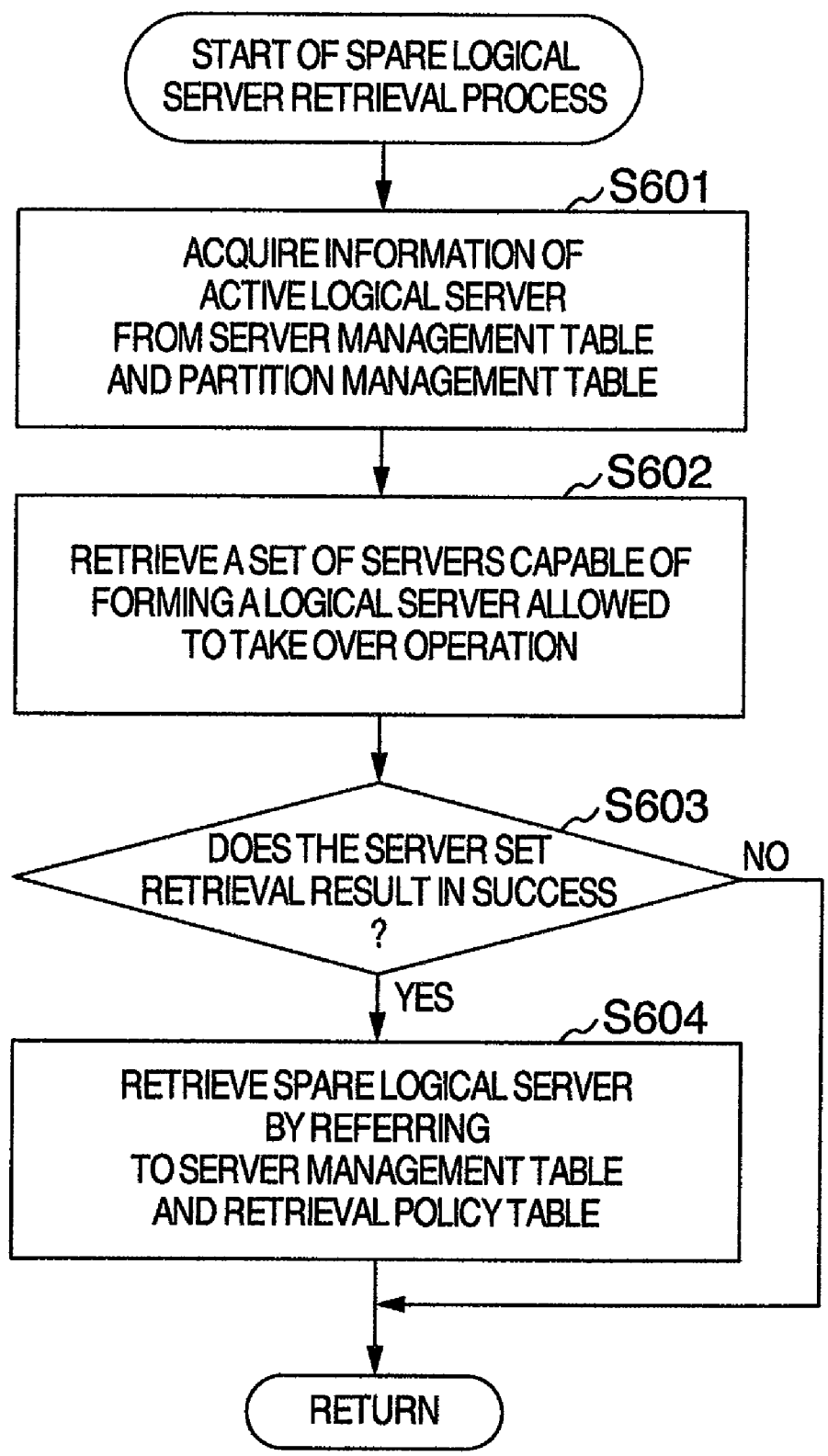
FIG. 12 is a flow chart showing a flow of a spare logical server retrieval process according to the second embodiment.

FIG. 12 is a flow chart showing a flow of a spare logical server retrieval process in the second embodiment. The process shown in FIG. 12 is for detailed description of the process in the step S107a in FIG. 11.

The server retrieval portion 111 acquires active logical server information from the server management table 116 (FIG. 2) and the partition management table 142 (FIG. 10) (S601). On this occasion, the server retrieval portion 111 acquires server identifiers of servers 102 as constituent members of the active logical server from the partition management table 142 with use of the partition identifier of the active logical server as a retrieval key. The server retrieval portion 111 further extracts information of the active logical server from the columns 204 to 209, etc. by referring to the server management table 116 with use of the acquired server identifier as a retrieval key.

Then, the server retrieval portion 111 retrieves free servers 102 by referring to the server management table 116 (FIG. 2) and compares the detected free servers 102 with hardware information of the active logical server as the active logical server information acquired in the step S601 to thereby retrieve combinations of servers 102 capable of constructing a spare logical server 150. That is, the server retrieval portion 111 retrieves combinations of servers 102 capable of constructing a logical server 150 to take over operation (S602).

When, for example, the active logical server is formed from two servers 102, the server retrieval portion 111 retrieves combinations of two servers 102 by retrieving two free servers 102. The combinations of servers 102 are candidates for a logical server 150. On this occasion, a plurality of logical servers 150 (combinations of servers 102) may be found out.

Then, the server retrieval portion 111 determines whether or not detection of any combination of servers 102 succeeded as a result of the step S602 (S603).

When the step S603 results in that the detection did not succeed (S603→No), the failover processing portion 110a moves processing to the step S501 in FIG. 11.

When the step S603 results in that the detection succeeded (S603→Yes), the server retrieval portion 111 retrieves a retrieval policy by referring to the server management table 116 (FIG. 2) and the retrieval policy table 118 (FIG. 4) with use of the server identifiers of servers 102 forming the active logical server as keys. Then, the server retrieval portion 111 retrieves servers 102 capable of constructing an optimum spare logical server 150 (spare logical server 1102) based on a combination of priority and retrieval policy of each logical server 150 from the logical servers 150 (combinations of servers 102) detected in the step S602. That is, the server retrieval portion 111 retrieves a spare logical server by referring to the server management table 116 and the retrieval policy table 118 (S604). Specifically, the server retrieval portion 111 acquires a corresponding retrieval policy by referring to the retrieval policy table 118 with use of the identifiers of servers 102 forming the active logical server as keys. When there are a plurality of retrieval policies acquired on this occasion, the server retrieval portion 111 may select one of the retrieval policies based on priorities of retrieval policies determined in advance. Then, the server retrieval portion 111 retrieves free servers 102 satisfying the acquired retrieval policy by searching the server management table 116.

After the step S604, the failover processing portion 110a moves processing to the step S501 in FIG. 11.

(Partition Configuration Change Process)

FIG. 13 is a chart showing a flow of a partition configuration change process according to the second embodiment. The process shown in FIG. 13 is for detailed description of the process in the step S503 in FIG. 11. This is a process in which the spare logical server (actually, a set of servers 102 as a candidate for a spare logical server) detected in FIG. 12 is constructed as an actual logical server 150.

First, the partition configuration change portion 143 requests the partition management portion 141 to construct a logical server 150 so that a partition is formed from the combination of servers 102 requested from the failover processing portion 11a (S701).

Then, the partition management portion 141 executes construction of the logical server 150 based on the requested combination of servers 102 (S702). Specific description of processing in the step S702 will be omitted because the processing is generally used processing. After completion of the construction of the logical server 150, the partition management portion 141 notifies the partition configuration change portion 143 of the completion of the construction of the logical server 150.

Then, the partition configuration change portion 143 designates the constructed logical server 150 as a spare logical server.

According to the second embodiment, the same effect as in the first embodiment can be obtained for logical servers 150 each of which is formed from at least one server 102.

Third Embodiment

A third embodiment of the invention will be described below with reference to FIGS. 14 and 15.

The third embodiment shows the case where priorities of servers 102 are changed based on performance information of shared devices at the time of spare server retrieval. Because the configuration of the failover system 10 for achieving the third embodiment is the same as shown in FIG. 1 except that the shared device management table 117 in FIG. 1 is replaced by a shared device management table 117b shown in FIG. 14, description of the configuration of the failover system 10 will be omitted.

(Shared Device Management Table)

The shared device management table 117b according to the third embodiment will be described below with reference to FIG. 14 in connection with FIG. 1.

FIG. 14 is a view showing an example of configuration of the shared device management table according to the third embodiment. In FIG. 14, constituent parts the same as those in the shared device management table 117 in FIG. 3 are referred to by numerals the same as those in the shared device management table 117 in FIG. 3 and description thereof will be omitted.

The point of difference of the shared device management table 117b from the shared device management table 117 shown in FIG. 3 is that 'number of connections' in a column 305 and 'average communication speed' in a column 306 are added.

The number of components connected to each shared device is stored in the column 305. When, for example, 'type of shared device' in the column 302 is 'chassis', the number of servers 102 (FIG. 1) set in the chassis 103 is stored in the column 305. When, for example, 'type of shared device' in the column 302 is 'FCSW', the number of HBAs 120 (FIG. 1) connected to the FCSW 105 is stored in the column 305. When, for example, 'type of shared device' in the column 302 is 'NWSW', the number of NICs 121 (FIG. 1) connected to the NWSW 106 is stored in the column 305.

The average communication speed in each shared device is stored in the column 306. For the chassis 103, the communication speed expresses a rate of data flowing in the network and I/O bus. For the FCSW 105 or the NWSW 106, the communication speed expresses a rate of data flowing in each switch. For example, the average communication speed (e.g. average speed per minute) is calculated by a method in which the shared device management portion 113 of the management server 101 requests the communication speed of each shared device via the network or by a method in which the shared device management portion 113 of the management server 101 receives notification of the communication speed from each shared device. Alternatively, the management server 101 can calculate the average communication speed by monitoring information flowing in the network.

(Server Retrieval Process)

Figure 15:
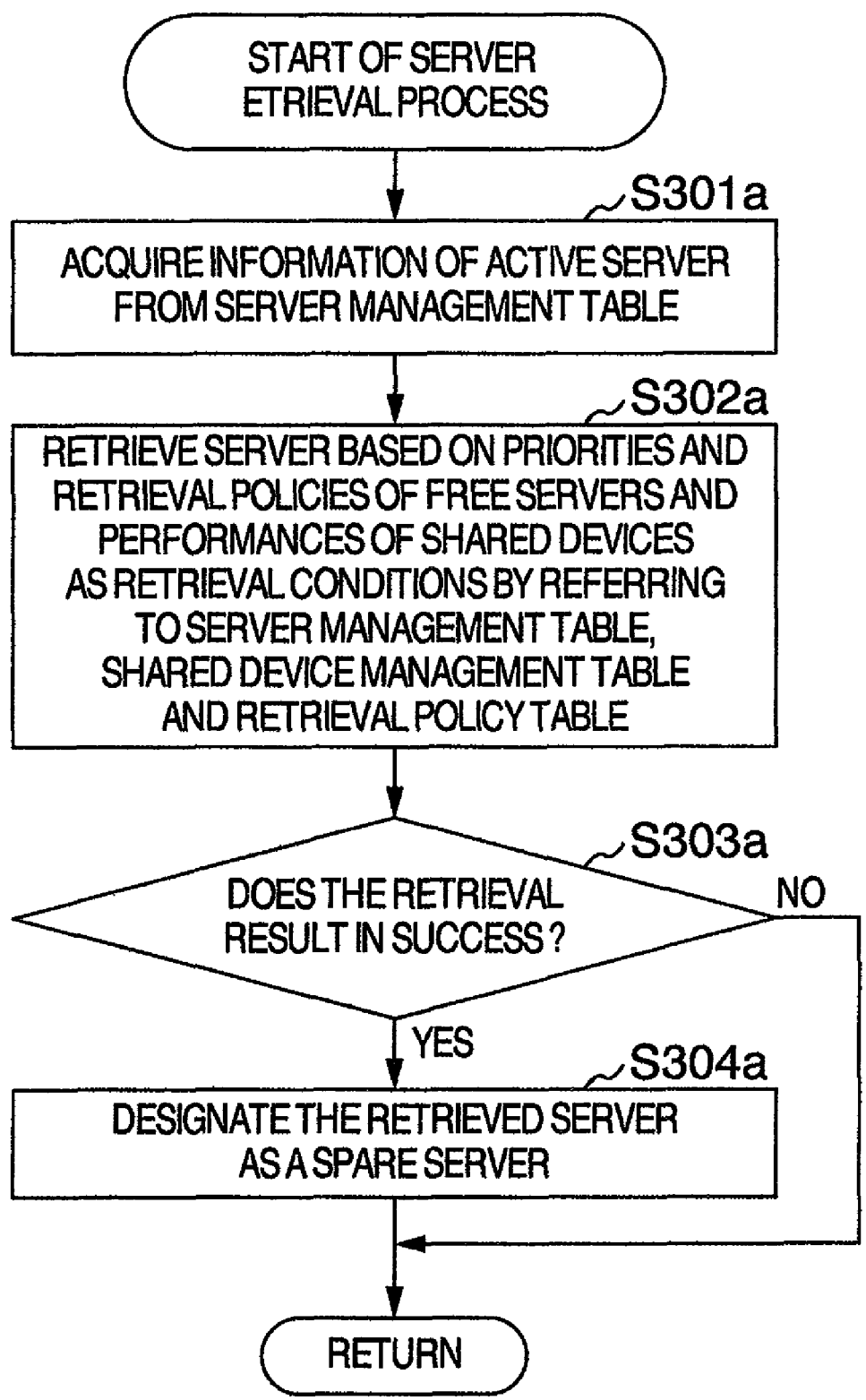
FIG. 15 is a flow chart showing a flow of a server retrieval process according to the third embodiment.

FIG. 15 is a flow chart showing a flow of a server retrieval process according to the third embodiment. The process shown in FIG. 15 is for detailed description of the process in the step S107 in FIG. 5 or in the step S205 in FIG. 6.

The point of difference of the server retrieval process shown in FIG. 15 from the server retrieval process shown in FIG. 7 lies in step S302a. Description of steps S301a, S303a and S304a will be omitted because the steps are the same as the steps S301, S303 and S304 in FIG. 7.

In the step S302a, the server retrieval portion 111 retrieves a server 102 (spare server) with use of performance information of shared devices as a retrieval condition in addition to the retrieval condition in the step S302 of FIG. 7. In the third embodiment, the performance information is defined as the number of constituent components of the failover system 10 connected to each shared device and the average communication speed in each shared device. The performance information can be acquired when the server retrieval portion 111 searches the shared device management table 117b (FIG. 14) with use of identifiers of shared device connected to a server 102 (which is a subject of processing) as retrieval keys. With respect to the performance information, a retrieval policy can be set. When, for example, 'chassis load sharing' is set as a retrieval policy, a server 102 is selected in such a manner that a chassis 103 smallest in the number of servers 102 connected to the chassis 103 or a chassis 103 lowest in communication speed is selected even when there are servers of the same priority. When a chassis 103 lowest in communication speed is selected, taking over operation to a server 102 mounted in a high I/O load chassis 103 can be avoided and the influence on other operations running on the chassis 103 can be reduced.

In the third embodiment, performance information of shared devices is used as a factor for changing the priority of a server 102 to take over operation. Besides the performance information, operating performance of each server 102, past trouble occurrence frequencies of each server 102 and each shared device, performance in taking over operation from an active server to a spare server, etc. can be used as a factor for changing the priority of the server 102 or as a spare server retrieval condition. When operating performance of each server 102 is used, it is possible to set a retrieval policy by which high priority is given to a server 102 exhibiting past good performance of an active server executing operation or a spare server taking over operation. When past trouble occurrence frequencies of each server 102 and each shared device are used, it may be possible to set a retrieval policy by which low priority is given to a server 102 connected to a shared device in which there was past notification of occurrence of trouble, such as device temperature rise, short of failure or breakdown. When past performance in taking over operation from an active server to a spare server is used, it may be possible to set a retrieval policy by which high priority is given to servers 102 of the same or like configuration information based on the combination of an active server and a spare server which succeeded in taking over operation.

(Hardware Configuration)

Figure 16:
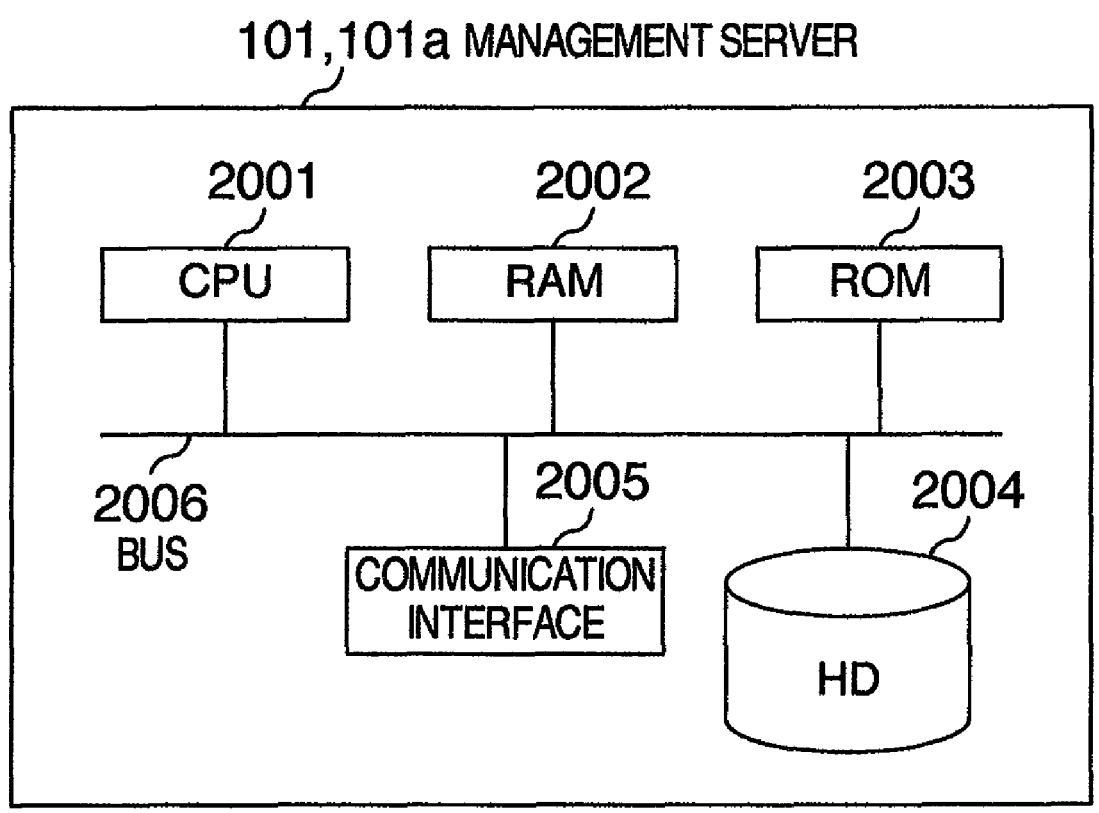
FIG. 16 is a diagram showing a hardware configuration example of a management server according to the first to third embodiments.

FIG. 16 is a diagram showing an example of hardware configuration of the management server according to any one of the first to third embodiments.

The management server 101 (or 101a) is configured so that a CPU 2001, an RAM (Random Access Memory) 2002, an ROM (Read Only Memory) 2003, an HD (Hard Disk) 2004 and a communication interface 2005 are connected to one another by a bus 2006.

The respective portions 110 to 116 (and 140 and 141) in the management server 101 (or 101a) shown in FIG. 1 (or 9) are realized when programs stored in the ROM 2003 and the HD 2004 are expanded into the RAM and executed by the CPU 2001.

The invention claimed is:

1. A failover method in a failover apparatus provided in a system with servers capable of communicating with one another, for taking over processing to a spare server selected from other servers than a server executing the processing when a failure occurs in the server executing the processing, wherein:

server priorities set based on operating statuses of the respective servers and devices capable of communicating with the respective servers in the system are stored in a storage portion of the failover apparatus so that the priorities are associated with the respective servers; and a processing portion of the failover apparatus retrieves a server based on the priorities stored in the storage portion and designates the retrieved server as the spare server when the failure occurs.

2. A failover method according to claim 1, wherein:

retrieval policies describing preference items for server retrieval are stored in the storage portion;

the priorities are updated based on the preference items determined by the retrieval policies; and the server retrieval is performed based on the updated priorities.

3. A failover method according to claim 2, wherein the retrieval policies are at least one of preference to a higher probability of operation recovery, preference to a server smaller in the number of devices connected to the server, preference to a server higher in redundancy of devices connected to the server, preference to a server placed in the same chassis, and preference to a server placed in another chassis.

4. A failover method according to claim 2, wherein the retrieval policies are designed so that a plurality of retrieval policies can be set for each server.

5. A failover method according to claim 1, wherein the failover apparatus acquires information about operating statuses from devices of the system at a predetermining timing and updates the priorities based on the acquired information.

6. A failover method according to claim 5, wherein the predetermined timing is when the failure occurs.

7. A failover method according to claim 5, wherein the predetermined timing is when any one of devices included in the system is changed or when the operating status of any one of devices included in the system is changed.

8. A failover method according to claim 1, wherein:
the servers are logical servers each provided as a set of servers; and
the priorities are set for the logical servers respectively.

9. A failover method according to claim 8, wherein the priority set for each logical server is set based on priorities of servers which are constituent members of the logical server.

10. A failover method according to claim 1, wherein:
performance information about respective devices of the system is stored in the storage portion so that the performance information is associated with the respective devices; and
the spare server is retrieved based on the priorities and the performance information when the retrieval is required.

11. A failover method according to claim 10, wherein the performance information is at least one member selected from the group consisting of the number of other devices connected to each device, and the communication speed in each device.

12. A failover method according to claim 1, wherein the devices connected to the servers are at least one member selected from the group consisting of Fibre Channel switches, network switches, and chassis.

13. A program for making a computer execute a failover method according to claim 1.

14. A failover apparatus in a system with servers capable of communicating with one another, for taking over processing to a spare server selected from other servers than a server executing the processing when a failure occurs in the server executing the processing, the failover apparatus comprising:
a storage portion in which server priorities set based on operating statuses of the respective servers and devices capable of communicating with the servers in the system are stored while the priorities are associated with the respective servers;
a server retrieval portion which retrieves a server based on the priorities stored in the storage portion when the failure occurs; and
a failover processing portion which designates the retrieved server as the spare server.

15. A failover apparatus according to claim 14, wherein:
retrieval policies describing preference items for server retrieval are stored in the storage portion;
the priorities are updated based on the preference items determined by the retrieval policies; and
the server retrieval portion performs the server retrieval based on the updated priorities.

16. A failover apparatus according to claim 14, wherein:
the servers are logical servers each provided as a set of servers; and
the priorities are set for the logical servers respectively.

17. A failover apparatus according to claim 14, wherein:
performance information about devices in the system is stored in the storage portion so that the performance information is associated with the devices; and
the server retrieval portion retrieves the spare server based on the priorities and the performance information when the retrieval is required.

18. A failover system comprising servers capable of communicating with one another, a failover apparatus which takes over processing to a spare server selected from other servers than a server executing the processing when a failure occurs in the server executing the processing, and devices capable of communicating with the respective servers, wherein:
the failover apparatus includes a storage portion in which server priorities set based on operating statuses of the servers and the devices capable of communicating with the respective servers in the system are stored so that the priorities are associated with the respective servers;
the failover apparatus retrieves a server based on the priorities stored in the storage portion when the failure occurs; and
the failover apparatus designates the retrieved server as the spare server.

* * * * *

UNITED STATES PATENT AND TRADEMARK OFFICE
CERTIFICATE OF CORRECTION

| | | |
|---|---|---|
| PATENT NO. | : 8,010,830 B2 | Page 1 of 1 |
| APPLICATION NO. | : 12/426493 | |
| DATED | : August 30, 2011 | |
| INVENTOR(S) | : Hotta et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 196 days.

This patent is subject to a terminal disclaimer.

Signed and Sealed this
Seventeenth Day of July, 2012

David J. Kappos
*Director of the United States Patent and Trademark Office*